United States Patent [19]

Senften

[11] 4,187,934
[45] Feb. 12, 1980

[54] SECTION INSULATOR FOR CATENARY SYSTEMS

[75] Inventor: John W. Senften, Mansfield, Ohio

[73] Assignee: Harvey Hubbell, Incorporated, Orange, Conn.

[21] Appl. No.: 869,036

[22] Filed: Jan. 13, 1978

[51] Int. Cl.² .................. B60M 1/18; B60M 1/22; B60M 1/225
[52] U.S. Cl. ........................................ 191/39; 191/41
[58] Field of Search .............. 191/39, 41, 42, 44.1

[56] References Cited

U.S. PATENT DOCUMENTS

| 2,013,355 | 9/1935 | Matthes | 191/40 |
| 3,898,372 | 8/1975 | Kalb | 174/179 |

FOREIGN PATENT DOCUMENTS

| 975821 | 10/1962 | Fed. Rep. of Germany | 191/42 |
| 18255 | of 1907 | United Kingdom | 191/39 |

Primary Examiner—Albert J. Makay
Assistant Examiner—Edmond G. Rishell, Jr.
Attorney, Agent, or Firm—Pearne, Gordon & Sessions

[57] ABSTRACT

A section insulator for insulating adjacent sections of contact wire of overhead power supply systems for electrified railway lines and the like is disclosed. The section insulator is interposed between separated ends of adjacent sections of contact wire. Strain plates are secured to the opposed ends of the sections and a strain insulator is secured to the strain plates above the level of the contact wires to maintain the tension in the contact wires. Spaced runners supported by the strain insulator extend between the contact wires, there being air gaps between the ends of the contact wires and the runners. A pair of diverging glider arms is secured to each contact wire section adjacent its end. The glider arms extend toward each other beyond the ends of the contact wire sections and overlap the ends of the runners, there being transverse air gaps between the diverging glider arms and the runners. The system thus provides a smooth under run from one section of contact wire along the diverging glider arms to the runners, then to the other pair of diverging glider arms and to the other section of contact wire. The insulator is supported by members extending vertically from the strain plates to a messenger wire, bridle, or other appropriate support. The section insulators can be adapted to use in ordinary catenary systems, compound catenary systems, ordinary direct suspension trolley systems, and as phase breaks for alternating current systems.

14 Claims, 16 Drawing Figures

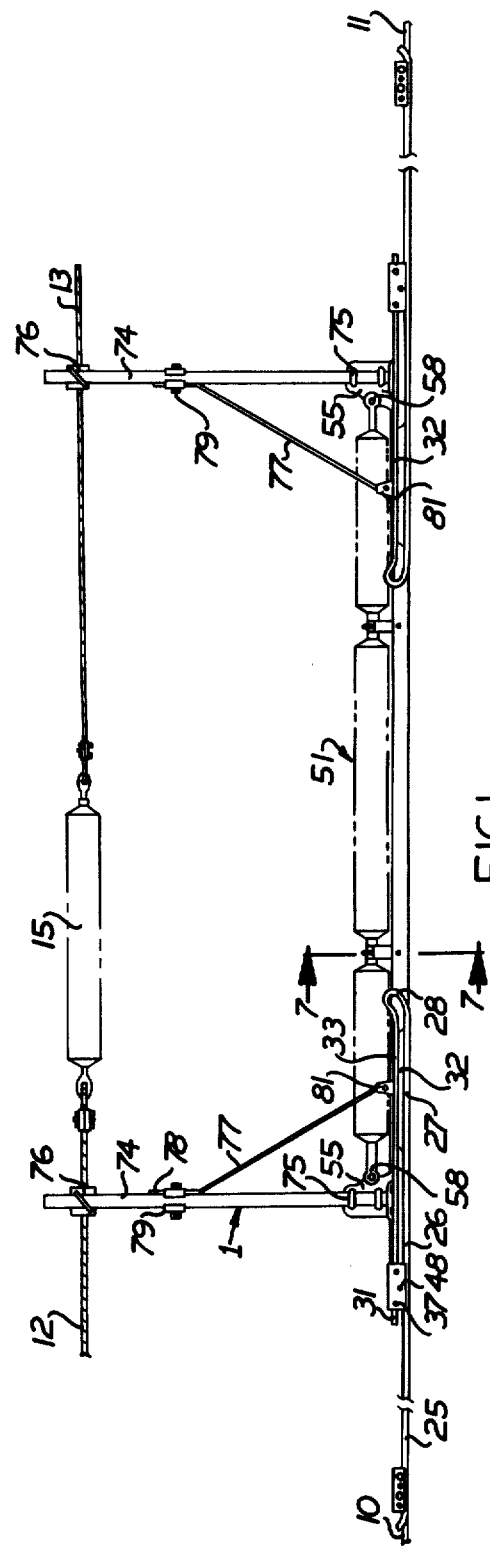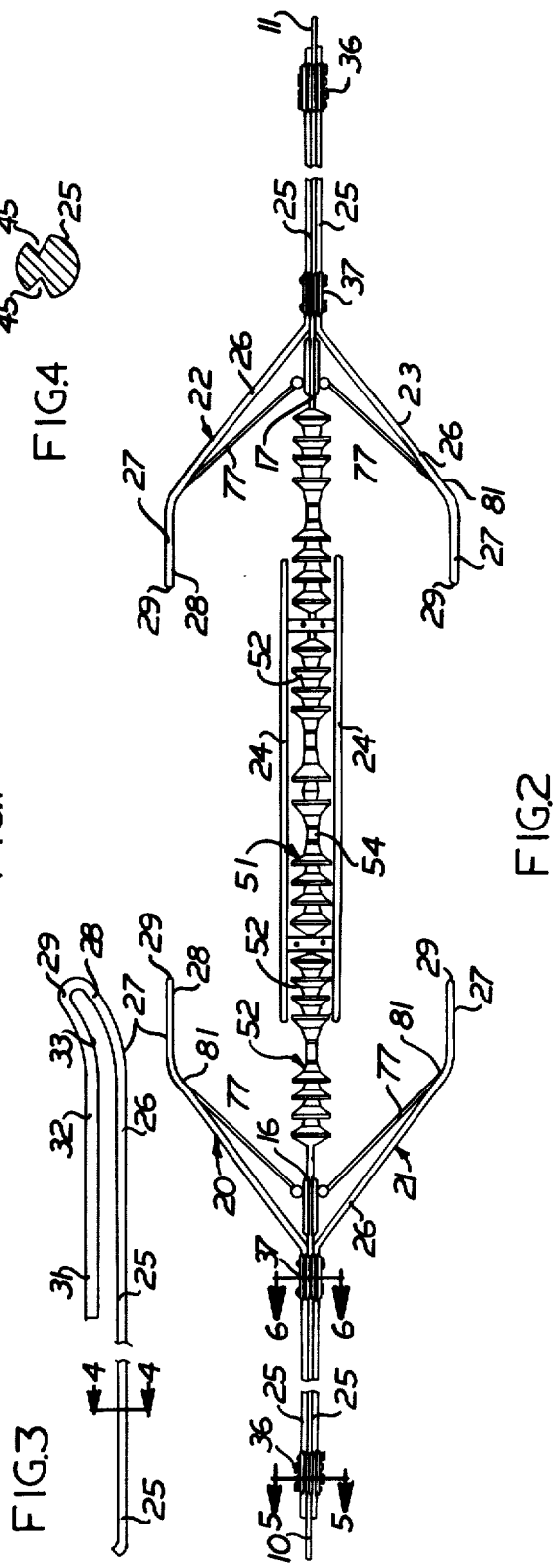

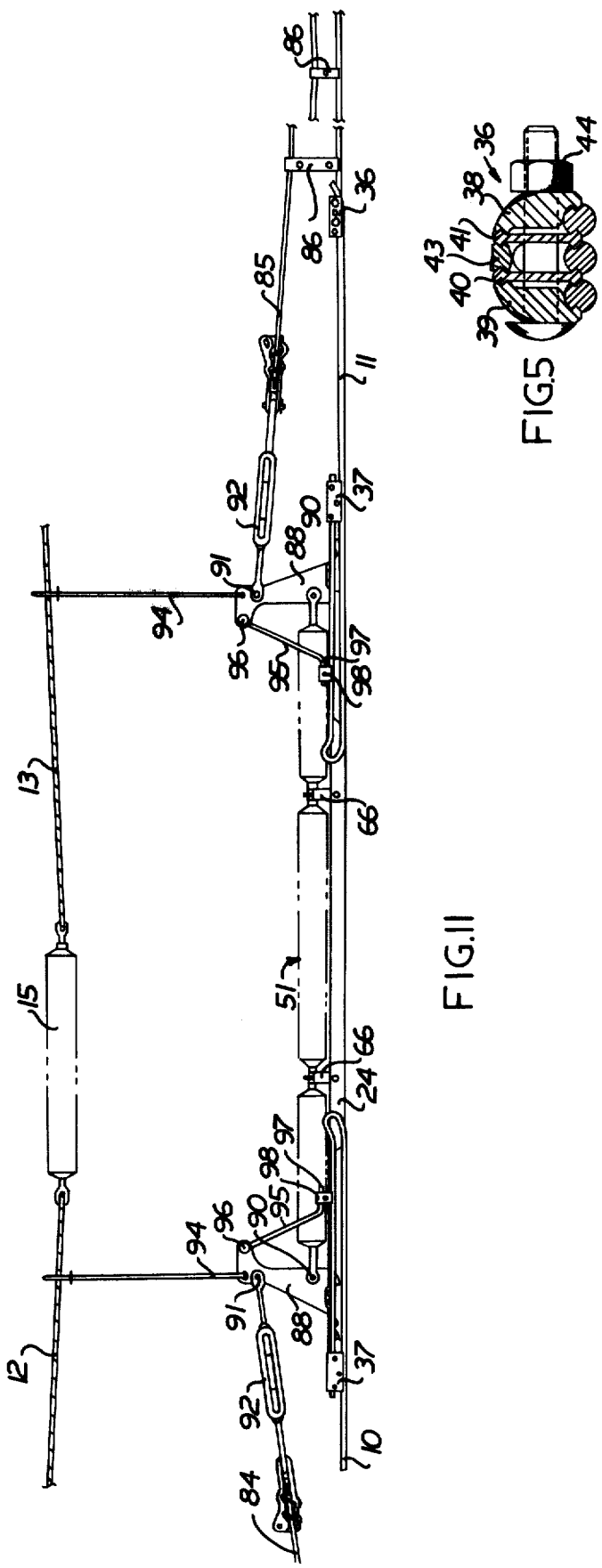
FIG.11
FIG.5
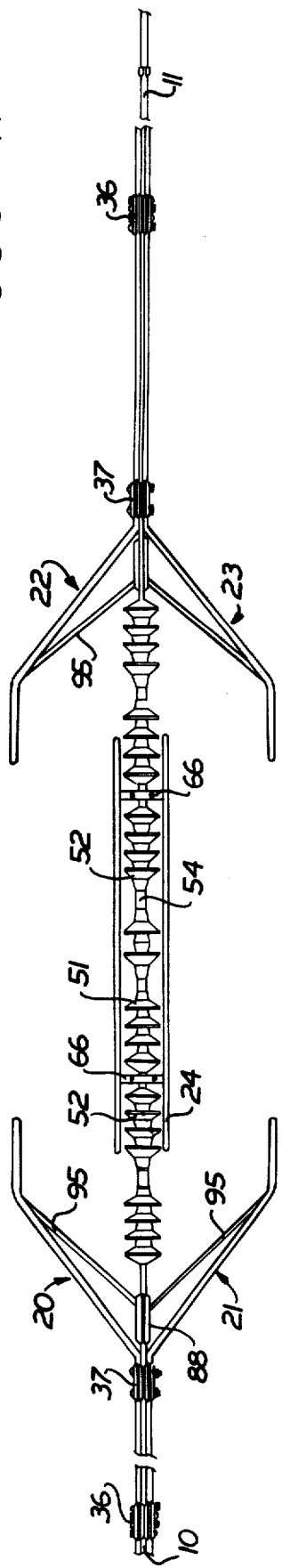
FIG.12

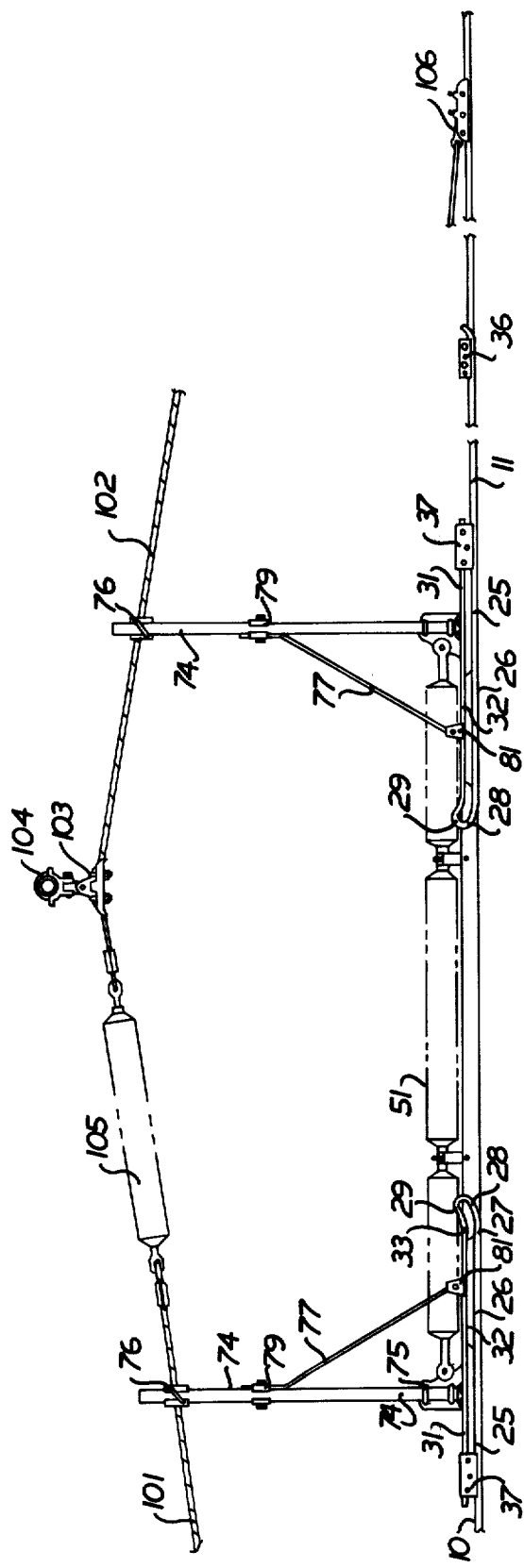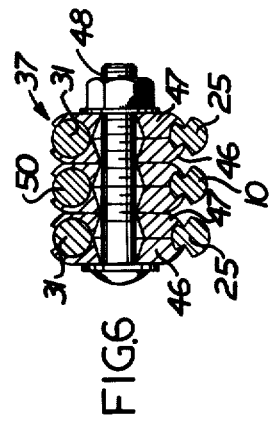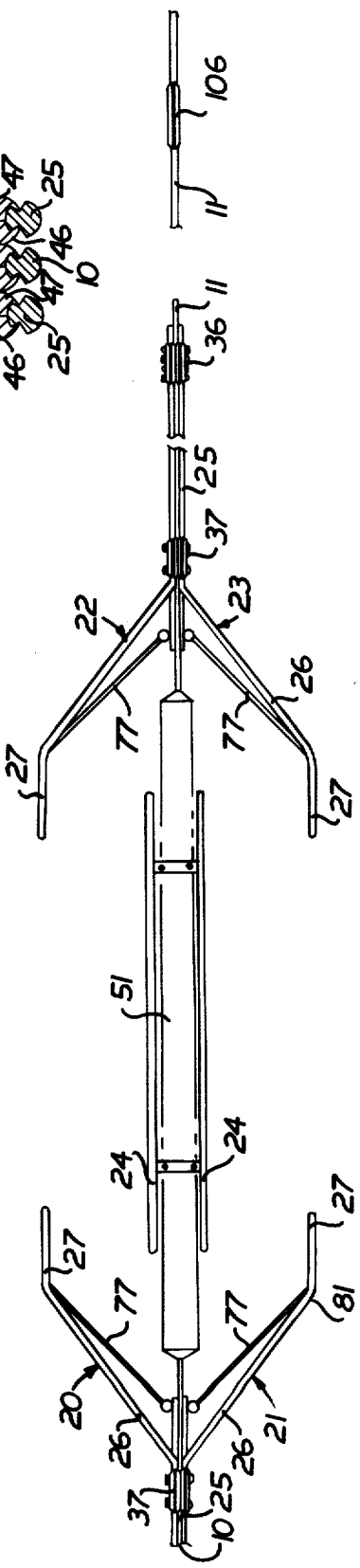
FIG.6
FIG.13
FIG.14

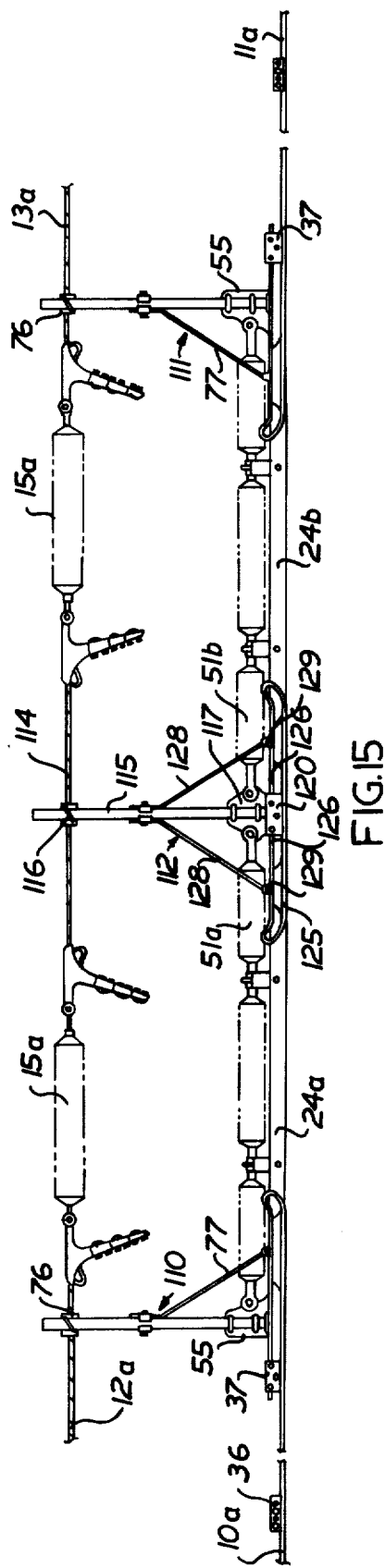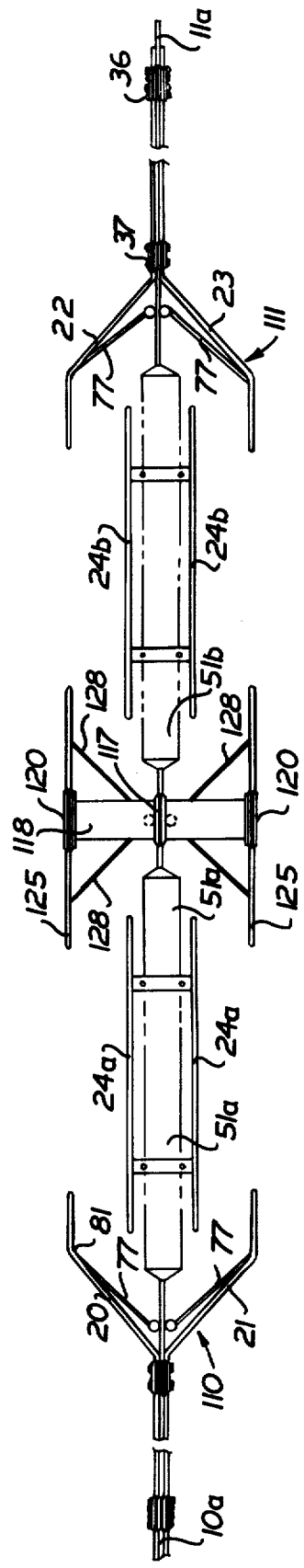

SECTION INSULATOR FOR CATENARY SYSTEMS

FIELD OF THE INVENTION

This invention relates to section insulators for the overhead trolley or contact wires of electric railway systems, and more particularly to section insulators for contact wires that are adapted particularly for use with current collectors of the pantograph type. The section insulators are also adapted for use in catenary systems in which the contact wires are suspended from messenger wires by hangers of different lengths spaced at equal intervals along the messenger and contact wires, the length of the hangers being such that the contact wires are suspended at a substantially constant distance above the tracks.

BACKGROUND OF THE INVENTION

In electric railway systems it is usual practice to interpose insulators at predetermined intervals between sections of the contact wire. The sections are ordinarily supplied with electric power by a feeder system extending along the track and the section insulators isolate the sections from each other and make it possible to de-energize sections as desired for maintenance or repair work.

Section insulators are also required in alternating current systems where the contact wires are supplied from the conductors of a three-phase system extending along the track, one phase being connected to one section of the contact wire, another phase to a succeeding section of the contact wire, and the third phase to still another such of the contact wire. This is done to balance the load on the three phases of the power supply and it is essential that each section of contact wire be insulated from adjacent sections that are energized by different phases of the power supply system. The section insulators for accomplishing this purpose are called "phase breaks" in the industry.

In both ordinary section insulators and phase breaks, it is essential not only that adjacent sections of contact wire be electrically insulated from each other, but also that mechanical connections between the sections be provided to maintain the proper tension in the adjacent sections of contact wire. Also, the contact wires in adjacent sections must be supported at uniform levels and the arrangement must be such that the current collectors on the trains, such as the contact bars of the pantographs, will ride smoothly and without instability from one contact wire across the section insulator to the next contact wire without undue sparking taking place and without the imposition of undue shocks or excessive mechanical forces on the pantograph, the contact wires, or the intermediate portions of the section insulators.

It has been proposed, as in British Pat. No. 18,255 of 1906, to employ forked members connected to the opposed ends of adjacent sections of the contact wires, the members having arms which are disposed on either side of an intermediate piece having a surface of insulating material that is engaged by the collector element during its passage from one forked member to the other. This system provides air gaps between the arms of the forked terminal members and the intermediate piece. The disclosed construction, however, embodies heavy rigid parts that would be expensive to construct and install, and severe shocks would be imposed not only on the pantograph and associated elements, but also on the section insulator itself, if used in high speed service. It has also been proposed to employ a forked glider member attached to one section of the contact wire and leading to a pair of spaced runners separated by transverse air gaps from the arms of the glider and carrying the pantograph or other contactor to the contact wire of the next section, vertical members connected by strain insulators and supported from an overhead structure being employed to maintain the tension in the contact wire sections.

SUMMARY OF THE INVENTION

A general object of the present invention is the provision of an improved section insulator for the contact wires of overhead power systems of electric railways and the like. Another object is the provision of such a system that can be manufactued and installed at relatively low cost as compared to present systems. Another object is the provision of such an insulator in which the parts that contact the current collectors of the vehicle being supplied with power are of such weight and flexibility that neither the current collectors of the vehicle nor the section insulators themselves are subject to undue shocks when the collectors pass over the section insulators, even though the vehicles may be operated at high speed. Further objects include the provision of section insulators having the advantages noted above which can be adapted to various types of overhead power installations such as simple catenary systems, compound catenary systems and systems in which the contact wires are directly supported. A further object is the provision of such section insulators that can be constructed to act as phase breaks for systems in which a polyphase alternating current supply system is employed.

According to preferred forms of the invention, these and other objects of the invention are obtained by the provision of an insulator assembly for mounting between adjacent ends of two conductive contact wires comprising a forked glider made up of a pair of glider arms attached to each of said ends, the glider arms having lower surfaces lying in the same plane as the contact wire at the point of attachment of the gliders thereto. The glider arms extend laterally outwardly from the line of said contact wires and the arms on the opposed ends of the contact wires extend toward each other beyond the ends of the respective contact wires. A pair of runners is mounted between the arms, the runners extending closer to the ends of said contact wires than the ends of the glider arms. The runners have surfaces lying in substantially the same plane as the pantograph engaging surfaces of the contact wires and the glider arms, whereby substantially smooth, level surfaces extending from one contact wire and one pair of glider arms across said runners to another pair of glider arms and another contact wire are provided, thereby furnishing a smooth, level under run for the pantographs. A strain insulator disposed above the level of said runners and in the same vertical plane as the opposed contact wires is mechanically connected to the contact wires by a rigid member and is arranged to maintain the tension of said contact wires and to support the runners. The assembly is supported from a cable disposed above the contact wires and means are provided balancing the turning forces applied to the rigid member because of the offset axes of the strain insulator and the contact wire. The gliders are preferably formed of the same kind of wire as the contact wires by bending into the desired shape. The runners may be of a convenient insulating material such as fiber reinforced plastic and the insulators preferably are light weight, small diameter, high strength insulators comprising a tension member composed of plastic bonded fiberglass and provided with weathersheds composed of a track-resistant rubber or rubber-like material for providing increased leakage distance along the fiberglass tension member. Insulators of this type are disclosed and claimed in U.S. Pat. No. 3,898,372, issued Aug. 5, 1975, and owned by the assignee of the present application.

BRIEF DESCRIPTION OF THE DRAWINGS

In the drawings, which illustrate preferred forms of the invention:

FIG. 1 is a side elevation of a section insulator adapted for use with a simple catenary suspension system;

FIG. 2 is a view of the section insulator of FIG. 1 looking up from beneath the insulator;

FIG. 3 is a side elevation of a glider arm used in the section insulator;

FIG. 4 is a section taken along line 4—4 of FIG. 3;

FIG. 5 is a section taken along line 5—5 of FIG. 2, and illustrating a known type of clamp utilized in the assembly;

FIG. 6 is a section taken along line 6—6 of FIG. 2, and illustrating another known type of clamp utilized in the assembly;

FIG. 11 is a side elevational view of a section insulator according to the invention, and adapted for use with a compound catenary suspension system;

FIG. 12 is a view of the section insulator of FIG. 11, looking up from beneath;

FIG. 13 is a side elevation of a section insulator according to the invention adapted for use with a direct suspension system;

FIG. 14 is a view of the section insulator of FIG. 13, looking up from beneath;

FIG. 15 is a side elevational view of a phase break for a catenary suspension system made according to the invention;

FIG. 16 is a view from beneath of the phase break illustrated in FIG. 11.

DESCRIPTION OF PREFERRED EMBODIMENTS

Figure 7:
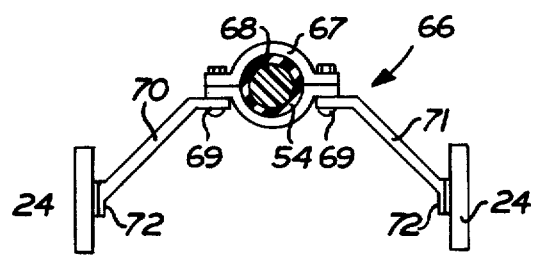
FIG. 7 is a section to an enlarged scale taken along line 7—7 of FIG. 1.
Figure 8:
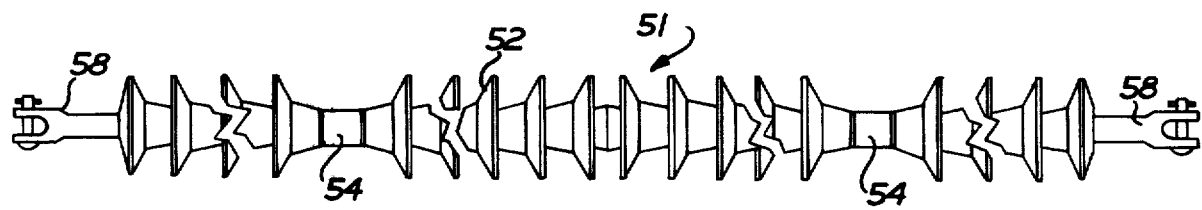
FIG. 8 illustrates a preferred type of strain insulator utilized in the assembly.

A section insulator adapted for a simple catenary overhead contact wire system is illustrated in FIGS. 1-8 of the drawings. In FIGS. 1 and 2 the section insulator assembly illustrated in general at 1 is shown as interposed between two contact wire sections 10 and 11. These are supported by conventional hangers, not shown, from messenger wires 12 and 13, respectively, that are connected together by a strain insulator 15 secured to the opposed ends of the messenger wires 12 and 13 by conventional fittings. The strain insulator 15 maintains the required tension in the messenger wires sections 12 and 13 and the section insulator assembly 1 is supported by the messenger wires. The strain insulator is preferably constructed in accordance with the aforesaid U.S. Pat. No. 3,898,372 and a suitable insulator is shown in FIG. 8, only the outline of the insulator being shown in FIG. 1.

In order to provide insulation between the sections 10 and 11 of the contact wires, the ends 16 and 17, respectively, of the wires 10 and 11 are spaced a distance apart that is determined by the system voltage and also by the construction of the pantograph collector system of the vehicles using the railway. A smooth, level under run to support the pantographs in their travel across the section insulator is provided by pairs of diverging glider arms 20 and 21 associated with contact wire section 10 and identical arms 22 and 23 associated with contact wire section 11. Runners 24 provide a level under run for the pantographs between the ends of the arms.

These arms are preferably all identical except that the arms in each pair are of opposite hand so that they will diverge as shown in FIG. 2. Each arm, as shown in FIGS. 1, 2 and 3, has an under run made up of a straight portion 25, a diverging portion 26 and an end portion 27 that is parallel to the portion 25. The end portions 27 of opposed arms project toward each other and are disposed beyond the ends 16 and 17 of the contact wires 10 and 11 and overlap the ends of runners 24. The end portions 27 are tilted upwardly, as shown at 28 in FIGS. 1 and 3, and the wire from which the gliders are formed, which is shown in cross-section in FIG. 4 and is preferably identical with the contact wire, is doubled back on itself as shown in FIGS. 1 and 3, providing upwardly extending rounded ends 29 on each glider arm. Each arm has an upper reach composed of portions 31, 32 and 33 that are spaced above but are substantially parallel to the portions 25, 26 and 27, respectively, of each arm. When the contact wire and portions of the arms are clamped together as described below, the resulting glider arm assemblies have sufficient strength and rigidity to withstand the forces exerted on them by the contact bars of pantographs passing beneath them, and also are of light weight and have flexibility comparable to that of the contact wires themselves so that shocks to both the pantograph and the suspension systems as the contact bars of the pantographs pass beneath the section insulators are minimized.

In order to secure the glider arms to the contact wires and to complete the glider assemblies, clamps 36 and 37 are employed. A cross-section of clamp 36 is shown to an enlarged scale in FIG. 5. The clamp comprises two oppositely facing outer jaws 38 and 39, two intermediate jaws 40 and 41 and a spacer 43. The parts are clamped together and into secure engagement with the contact wire 10 and the portions 25 of the glider arms by transversely extending bolt and nut assemblies 44 spaced longitudinally along the clamp. The contact wire and the wire from which the gliders are formed is preferably of the grooved type as shown in FIG. 4, having longitudinally extending grooves 45, as shown, which are engaged by the outer jaws 38 and 39 and the intermediate jaws 40 and 41. Clamps of this type are well known. Other known types of clamps can be employed and while grooved wire is preferred, wires of round or other cross-sectional shapes may be employed with appropriate clamps adapted to the purpose. The clamp 36 firmly secures the contact wire 10 to the portions 25 of the arms 20 and 21 and a similar clamp 36 is employed to secure the portions 25 of the glider arms 22 and 23 to the contact wire 11 at the opposite end of the section insulator assembly.

The clamp 37, see FIG. 6, that supports the end portions 31 of the upper reaches of the glider arms, is made up of three pairs of oppositely facing jaw members 46, 47 which are clamped together by nuts and bolts 48. The lower portions of the jaw members clamp the contact wire 10 and the portions 25 of the arms 20 and 21, while the upper portions of the outer pairs of jaw members engage and clamp the upper end portions 31 of the arms 20 and 21. A short section 50 of wire is disposed in the upper portions of the central pair of the clamping jaws for balancing purposes. A similar clamp 37 is utilized in connection with the arms 22 and 23 at the opposite side of the section insulator. The clamps 36 and 37 firmly secure the arms of the gliders to the contact wires and provide a smooth under run for the pantographs with a smooth transition between the center contact wires and the glider arms. The clamping jaws of the clamps 36 and 37 are composed of alloys that are corrosion resistant and have ample electric conductivity to meet the requirements.

In order to maintain the tension in the contact wires 10 and 11 as well as to support the runners 24, a strain insulator 51 is provided. Insulator 51, like insulator 15, is preferbly constructed in accordance with U.S. Pat. No. 3,898,372 and comprises an elongated tension member in the form of a fiberglass rod 68 to the ends of which appropriate connecting fittings are secured. The rod is enclosed in weathersheds 52 composed of track resistant rubber or rubber-like insulating material. The weathersheds provide the required leakage distance between the ends of the insulator and also protect the rod from weather and sabotage. As indicated in the drawings, the weathersheds may be arranged in groups, as shown in FIGS. 2 and 8, with sleeves 54 embracing the central fiberglass rod between groups of weathersheds. In FIGS. 1, 11, 13, 14, 15 and 16, only the outlines of the weathersheds are indicated, by borken lines, for convenience of illustration.

Figure 10:
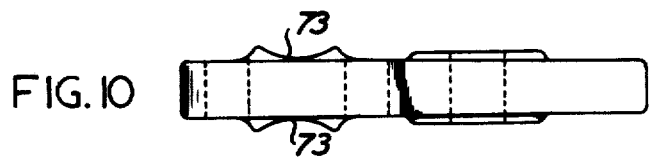
FIG. 10 is a top plan view of the strain plate of FIG. 9.
Figure 9:
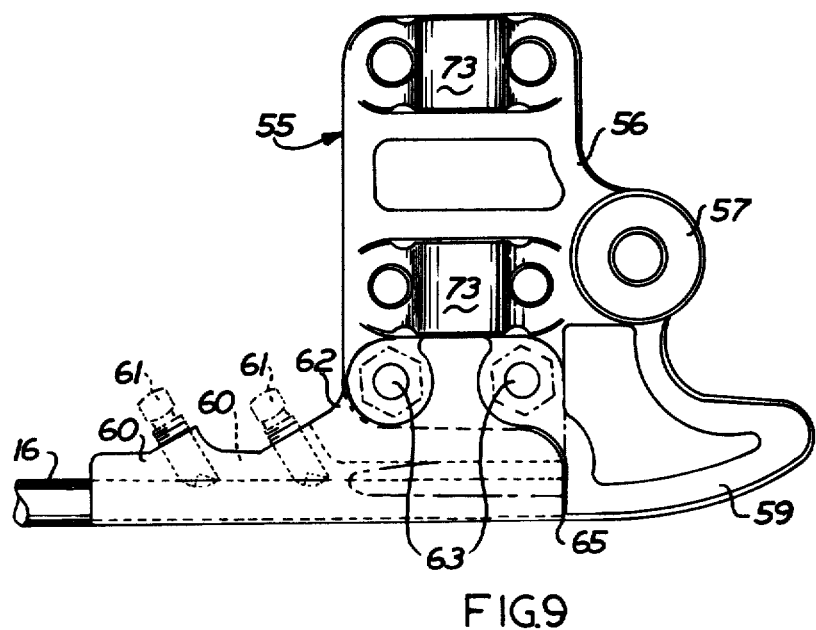
FIG. 9 is an elevation of a strain plate and clamp assembly utilized in the section insulator of FIGS. 1 and 2.

In order to connect the insulator 51 to the ends 16 and 17 of the contact wires 10 and 11, strain plates 55 are secured to the ends 16 and 17, respectively. These strain plates, which may be malleable iron castings, and their connections to the ends of the contact wire sections are identical and only the connection for the end 16 of wire 10, which is shown in FIGS. 9 and 10, is described herein. As there shown, the strain plate 55 comprises a body 56 having an eye 57 to which the clevis end connection 58 of the insulator 51 is attached. The bottom of the strain plate is provided with a curved guide portion 59 to minimize possible shock on engagement or disengagement of the contact bars of the pantographs and the strain plate. The contact wire end 16 is secured to a conventional tip 60 which is of known construction, being generally similar to the tips disclosed in U.S. Pat. No. 2,013,355, issued Sept. 3, 1935. The end of the contact wire fits into a properly shaped groove in the bottom of the tip and is secured therein by set screws 61. The upper portion 62 of the tip 60 is in the form of a clevis that receives the lower portion of the strain plate 55 and is secured thereto as by bolts 63. The curved bottom portion 59 of the strain plate terminates in a shoulder that abuts the end of the tip 60 as shown at 65. The abutting parts are at the same level and are smooth so that the contact bars of the pantographs travel smoothly over them. The strain insulator 51 is securely connected to the contact wires 10 and 11 through the strain plates 55 and tips 60 and functions to maintain the required tension in the wires.

In order to support the runners 24 from the insulator 51, brackets 66 as illustrated in FIG. 7 are provided. These brackets are preferably identical and each comprises a two-piece metal ring 67 that may be clamped on one of the rubber sleeves 54 surrounding the figerglass tension rod 68 of the insulator 51 between groups of weathersheds 52. The bolts 69 that clamp the two parts of the ring 67 together also secure depending supporting arms 70 and 71 to the rings. The supporting arms diverge and the vertical end portions 72 thereof are bolted to the runners 24 supporting the runners with their lower surfaces at the same level as the underneath surfaces of the gliders.

It will be noted that since the axis of the insulator 51 is disposed above the axis of the contact wires 10 and 11, and since the forces exerted by the insulator and the contact wires on the strain plates are in opposite directions, turning moments are set up in the strain plates. In order to resist these moments and to hold the strain plates in proper position, as well as to support the entire section insulator assembly, the opposed faces of the bodies 56 of the strain plates 55 are provided with arcuate seats 73 to which pairs of vertically extending pipe sections 74 are secured as by U-bolts 75, or other appropriate clamping means. The upper ends of the pipe sections 74 are secured to the messenger wire sections 12 and 13 by conventional clamping means 76. The pipe sections with their attachment to the messenger wire thus resist the turning moment imposed on the strain pltes by the insulator and the contact wires. The pipe sections also support the entire section insulator assembly from the messenger wire, the level of the assembly being adjustable by adjusting the level at which the pipe sections 74 are secured to the messenger wire by the clamps 76.

In order to make possible the adjustment of the diverging glider arms 20, 21, 22 and 23 to the correct level to insure smooth transfer of the contact bars of the pantographs between the runners 24 and the glider arms, adjustable diagonal braces 77 are provided. These braces have vertically extending upper end portions 78 that are adjustably secured to the respective pipe sections 74 by appropriate clamps 79. The lower ends of the braces 77 are secured to the diverging portions 32 of the upper reaches of the gliders by appropriate clamps 81. Clamps 81 can be secured at desired locations on the arms. By proper adjustment of these elements, the level of the ends 27 of the glider arms can be correlated with the level of the runners 24 so that the passage of the contact bars of the pantographs between the glider arms and the ends of the runners which they overlap takes place smoothly and without undue shock.

The clamps 81 that secure the braces 77 to the portions 32 of the upper reaches of the glider arms may be constructed in any convenient manner. For example, each clamp may comprise a pair of oppositely facing clamping jaws which, when assembled and clamped together as by a bolt, provide a horizontal clamping recess for engagement with the portions 32 of the glider arm with which it is associated, and a vertical clamping recess that is simultaneously clamped into engagement with a vertical end portion of one of the braces 77. It will be evident that with this arrangement the clamps 81 can be moved readily to desired positions of adjustment along the arms; this adjustment coupled with the vertical adjustment of the braces 77 and the clamps 79 makes it possible precisely to locate the glider arms at desired levels to insure a smooth transfer of the pantographs from the glider arms to the runners 24.

The wide spacing of the glider arms and the substantial transverse spacing between the runners 24 insures that these parts will not be tilted or displaced substantially by the passage of pantographs beneath them. It is further to be noted that in the preferred form of insulators the rubber weathersheds can be of fairly small diameter as compared to conventional porcelain insulators, the rubber weathersheds having a diameter of, for example, five or six inches in typical installations. Because of the small diameter, the runners 24 can be spaced apart a distance greater than the diameter of the weathersheds. This permits water dripping from the insulator 51 to fall directly through the space between the runners to the ground, rather than being deposited on the runners and then running off of the runners to the ground. This arrangement reduces the likelihood of contamination of the runners.

The construction embodying the preferred light weight insulators having great tensile strength makes it possible to provide a light weight section insulator in which the strain insulators not only take the tension of the contact wires but also function to support the runners. The comparatively small diameter of the weathershed on the insulators has the further advantage in that it makes it possible to have the axis of the insulators displaced only a comparative short distance, a matter of a few inches, above the axis of the contact wires 10 and 11. This displacement necessarily results in a turning moment in the strain plates but this moment is not unduly large since the moment arm is short. Thus, the moment can readily be resisted by the pipe sections 74 which are secured to the messenger wire. Some of the tension of the contact wires is thus transferred to the messenger wires and no additional structure is required to resist this tension. Thus, the entire assembly can be of light weight as compared to prior section insulators and the light weight and low inertia of the parts reduces shocks that may be imposed on both the pantographs and the section insulators in service. Shocks are further reduced by the flexibility of the arms and by the fact that the glider arms can be accurately leveled with respect to the runners 24.

Good electrical performance is assured by the dual air gaps between the glider arms and the runners 24. Thus, even though the runners may be so contaminated by atmospheric pollutants that they are conductive, no damage will result because during the time that a pantograph is in contact with both the ends of runners 24 and the end portions of the glider arms 20 and 21 that are connected to the contact wire 10, the normal air gap between the glider arms 22 and 23 connected to the contact wire 11 and the runners 24 remains. Likewise, the air gap between the glider arms 20 and 21 and the adjacent ends of the runners 24 becomes effective as soon as the pantograph has moved beyond contact with the arms 20 and 21 so that no short circuit can take place when the pantograph comes into contact with the arms 22 and 12 that are connected to the contact wire 11. The same functioning is present with respect to pantographs travelling in the opposite direction. Inasmuch as there is always at least one air gap interposed between the contact wires 10 and 11, for some services such as relatively low voltage services, the runners 24 need not be constructed of insulating material, runners formed by bending pieces of ordinary contact wire into a desired shape being suitable.

Section insulators made according to the present invention may be adapted to suspension systems of various types. FIGS. 11 and 12 of the drawings illustrate an adaptation of the invention to a system of the compound catenary type. In these figures, the same reference characters as used previously have been applied to corresponding parts. Here, the contact wires 10 and 11 are supported from auxiliary messenger wires 84 and 85 by conventional hangers 86, only a few of which are shown. The auxiliary messenger wires 84 and 85 in turn are supported by main messenger wires 12 and 13 by conventional hangers, not shown. A strain insulator 15 is interposed between messenger wires 12 and 13 as before. In this form of the invention, the glider arms 20, 21, 22 and 23 are identical with those of the same number previously described and are secured to the contact wires 10 and 11 by clamps 36 and 37, as before. Runners 24 are interposed between the arms 20, 21 and 22, 23, as before. A strain insulator 51 supports the runners 24 and the ends of the strain insulator 51 are secured to strain plates 88 which, in turn, are secured to contact wires 10 and 11 in the same manner that strain plates 55 are secured to contact wires 10 and 11, as previously described. Strain plates 88, however, are taller than previously described strain plates 55. Strain plates 88 are provided with means as at 90 for connection to the insulator 15, and are also connected as at 91 to turnbuckles 92, which in turn are connected by appropriate clamps to the auxiliary messenger wires 84 and 85.

In order to support the assembly, suspension members 94 are secured to the strain plates 88 and extend upwardly to the messenger wires 12 and 13. In order to adjust the level of the gliders, braces 95 are pivotally secured as at 96 to the upper portions of the strain plates. These braces terminate in lower horizontal portions 97 which are adjustably secured to the upper reaches of the glider arms as by clamps 98. By changing the position of the clamps on the glider arms, the level of the arms can be adjusted as was the case with the glider arms of FIGS. 1 and 2. It will be noted that in this form of the invention the turning moment imposed on the strain plates 88 by the opposed forces exerted on them by the contact wires 10 and 11 and the insulator 51 are resisted by the auxiliary messenger wires 84 and 85. By proper adjustment of the turnbuckles 92, the turning moments exerted upon the strain plates by the contact wires, the insulator 51 and the auxiliary wires can be balanced and therefore the suspension members 94 can simply be sections of steel cable or light walled pipe, if desired, since these members are not subjected to any substantial bending forces.

The operation and advantages of the section insulator of FIGS. 11 and 12 are the same as the operation and advantages of the section insulator shown in FIGS. 1 and 2.

As shown in FIGS. 13 and 14, section insulators made according to the invention can be adapted readily to overhead trolley systems of the direct suspension type. In these figures the section insulator indicated in general at 1 is in all material respects identical with the section insulator 1 of FIGS. 1 and 2 and the same reference characters as in FIGS. 1 and 2 have been applied to the parts in these figures. Here, however, the contact wires 10 and 11 are directly supported from support arms projecting from poles (not shown) extending along the track and the section insulator is supported by a bridle made up of supporting cables 101 and 102 which are supported by a conventional fitting 103 secured to the transversely extending arm 104 shown in end view in FIG. 13. The arm is insulated in accordance with conventional practice and is carried by a track side pole, not shown. An insulator 105 is interposed between the supporting cable sections 101 and 102. The section insulator assenbly is supported from the supporting cables by means of the vertical pipe sections 74, identical with those sections of corresponding number described in connection with FIGS. 1 and 2. As before, conventional clamps 76 are employed to secure the pipe sections 74 to the supporting cables. The cables extend for some distance above the contact wires, the cable 102 being secured to the contact wire 11 by a conventional clamp 106 and the cable 101 being secured to the contact wire 10 by a similar conventional clamp, not shown. The cables 101 and 102 slant downwardly to the line of the contact wires, the distance from the supporting arm 104 and fitting 103 to the contact wires depending upon the design, but in a conventional system distances of the order of 50 feet may be satisfactory. In this type of system, the tension of the contact wires is maintained in part by the insulator 51 and in part by the bridle wire. If desired, turnbuckles may be incorporated in the sections 101 and 102 making up the bridle wire in order properly to balance the forces.

This form of the invention has the advantages of the previous forms of light weight, resilience, simplicity of manufacture and assembly and protection afforded by dual air gaps.

FIGS. 15 and 16 illustrate the invention as it may be applied to a phase break for alternating current systems in which a central grounded element is employed, thereby to prevent the possibility of any line-to-line short circuiting taking place. The phase break of this system is interposed between the ends of contact wires 10a and 11a and comprises end assemblies indicated in general at 110 and 111. End assemblies 110 and 111 are identical in all material respects with the end assemblies of the section insulator 1 of FIGS. 1 and 2 of the drawings and the same reference characters have been applied to corresponding parts. However, when the invention is adapted to a phase break, an intermediate grounded assembly indicated in general at 112 is interposed between the assemblies 110 and 111. The intermediate assembly 112 is supported by a central portion 114 of the messenger wire, which is insulated from the adjacent sections 12a and 13a of the messenger wire by insulators 15a. Portion 114 of the messenger wire may be suitably grounded.

The intermediate assembly 112 of the phase break is supported by downwardly extending pipe sections 115, which are secured by a conventional clamp 116 to the portion 114 of the messenger wire. These pipe sections at their lower ends are secured to a double strain plate 117 which is generally similar to the strain plates 55 previously described, except that it has oppositely disposed means for attachment to the insulators 51a and 51b of end assemblies 110 and 111. Also, the bottom end of the strain plate 117 is secured to a transversely extending plate 118 as by bolting. The plate 118 is appropriately secured to clamps 120, which support longitudinally extending intermediate gliders 125. These gliders may be formed by bending an appropriate length of contact wire into the shape shown in FIG. 15 and the opposed ends 126 of the upper reaches of the gliders are secured by the clamps 120. Diagonal braces 128 are adjustably clamped to pipe sections 115 and the upper reaches of the gliders 125 as at 129 so that the level of the gliders 125 can be adjusted.

In this form of the invention, the contact bars of the pantographs travel from one end assembly 110 over the gliders 20 and 21 thereof to the runners 24a, which are supported in a manner previously described from the insulator 51a. As the pantographs approach the ends of the runners 24a, they reach the intermediate longitudinally extending gliders 125, which are grounded through the grounded portion 114 of the messenger wire, travel along the gliders 125 to the next set of runners 24b and then to the gliders 22 and 23 of the end assembly 111, and ultimately to the contact wire 11a. With this arrangement, there are separate air gaps between the end assemblies and the center grounded assembly and strain insulators between these assemblies, as well as pairs of transversely extending air gaps between the glider arms and the runners and between the intermediate gliders 125 and the runners. Thus, the assembly provides a light weight phase break with a smooth under run in which the levels of the gliders and the runners can be adjusted accurately to each other and in which the portions of the gliders that contact the pantographs have approximately the same degree of flexibility as the contact wires whereby shocks to the pantograph and the parts that are in contact therewith are minimized. The presence of the four sets of lateral air gaps precludes line-to-ground or line-to-line short circuits even though the runners should become so contaminated as to be conductive.

From the foregoing, it will be seen that the invention provides light weight, efficient section insulators that can be adapted to a variety of purposes. The design of the section insulators is such as to take advantage of the qualities of lightness and strength, as well as compactness found in the preferred form of strain insulators. The lightness is important from the standpoint of the structure required to support the section insulators, the ease of installation of the section insulators, and the reduction of shock that might otherwise be occasioned as the pantographs pass over the insulators.

Various changes and modifications can be made in the preferred forms of the invention disclosed herein without departing from the spirit and scope of the invention. The essential characteristics of the invention are defined in the appended claims.

I claim:

1. A section insulator assembly for mounting between spaced aligned ends of two contact wires of an overhead power supply of an electrified transportation system, there being a supporting cable above said contact wires, said assembly comprising main strain insulator means extending between the ends of the two contact wires at a level above the level of the contact wires, rigid means secured to each contact wire and to the adjacent ends of the strain insulator means, the strain insulator means being secured at a level above the level of the contact wires to the rigid means thereby to maintain the tension in the contact wires, a runner supported by and disposed at a level lower than said strain insulator means, and means extending downwardly from said supporting cable adjacent each end of said strain insulator means for supporting said assembly, said supporting means comprising a rigid supporting member rigidly secured to each of said rigid means and fixed to said supporting cable, whereby said rigid supporting members support said assembly and resist the turning moment imposed on the rigid means by reason of the offset between the axes of the contact wire and the strain insulator means, a pair of glider arms mounted at the ends of the contact wires, the glider arms in each pair extending laterally outwardly from the adjacent contact wire and extending longitudinally to overlap the ends of said runner, there being lateral air gaps between said runner and said glider arms.

2. A section insulator assembly according to claim 1 wherein said rigid means comprises a strain plate secured to the end of each contact wire and extending upwardly therefrom, the ends of said strain insulator means being secured to said strain plates.

3. A section insulator assembly according to claim 2 wherein said means extending downwardly from said supporting cable are secured to said strain plates.

4. A section insulator assembly for mounting between spaced aligned ends of two contact wires of an overhead power assembly of an electrified transportation system, there being a supporting cable above said contact wires, said assembly comprising main strain insulator means extending between the ends of the two contact wires at a level above the level of the contact wires, a strain plate secured to the end of each contact wire and extending upwardly therefrom, the ends of said strain insulator means being secured to said strain plates, the strain insulator means being secured at a level above the level of the contact wires to the strain plates thereby to maintain the tension in the contact wires, a runner supported by and disposed at a level lower than said strain insulator means, and means extending downwardly from said supporting cable adjacent each end of said strain insulator means for supporting said assembly, said means for supporting said assembly comprising a rigid supporting member rigidly secured to each strain plate and fixed to said supporting cable, whereby said rigid members support said assembly and resist the turning moment imposed on the strain plates by reason of the offset between the axes of the contact wire and the strain insulator means, a pair of glider arms mounted at the ends of the contact wires, the glider arms in each pair extending laterally outwardly from the adjacent contact wire and extending longitudinally to overlap the ends of said runner, there being lateral air gaps between said runner and said glider arms.

5. A section insultor assembly according to claim 1 wherein there are two transversely spaced runners supported by said strain insulator means.

6. A section insulator assembly according to claim 5 wherein said strain insulator means is provided with transversely extending weathersheds between the ends thereof.

7. A section insulator assembly according to claim 6 wherein there are two runners mounted below and supported by said strain insulator means, said runners being transversely spaced apart by a distance at least as great as the transverse dimension of said weathersheds, whereby clearance is provided between said insulator and said runners for rain dropping from said insulator.

8. A section insulator assembly according to claim 1 having braces extending from said rigid supporting members to said glider arms, the positions of said braces being adjustable whereby the height of said glider arms can be adjusted.

9. A section insulator assembly according to claim 8 wherein said runners are composed of insulating material.

10. A section insulator assembly according to claim 1 wherein said supporting cable comprises two sections of a main messenger wire that are insulated from each other.

11. A section insulator assembly according to claim 1 wherein said strain insulator means and said runner extend continuously from a region near the end of one contact wire to a region near the other contact wire.

12. A section insulator assembly according to claim 1 having two pairs of aligned runners, the ends of said pairs of runners remote from the ends of said contact wires being spaced from each other, an intermediate pair of gliders bridging the longitudinal gap between said runners, there being transverse air gaps between said intermediate gliders and the runners in each pair, means for supporting said intermediate gliders from said supporting cable, said strain insulator means having a section extending from a point adjacent the end of one section of contact wire to said means for supporting said intermediate gliders and another section extending from said means for supporting said intermediate gliders to a point adjacent the other section of contact wire.

13. A section imnsulator assembly according to claim 1 wherein said supporting cable comprises a bridle made up of two cable sections secured to each other by a strain insultor, the bridle being supported intermediate its ends by a transversely extending arm, the opposite ends of the bridle being secured to the contact wire sections at points remote from the ends of the contact wire sections, the bridle sloping downwardly in opposite directions from its point of support by said transversely extending arm to the points of connection of the ends of the bridle to the contact wire sections, and the section insulator assembly being supported by said supporting means extending downwardly from said bridle on opposite sides of said supporting arm.

14. A section insulator assembly according to claim 1 wherein said strain insulator means comprises a central tension member composed of fiber reinforced plastic provided with metal end fittings and weathersheds on said tension member composed of rubber-like material.

* * * * *